Jan. 27, 1970     C. NEWSTEAD     3,491,606
ROLLER EXPANDER ACTUATOR FOR VEHICLE BRAKES
Filed July 15, 1968     4 Sheets-Sheet 4

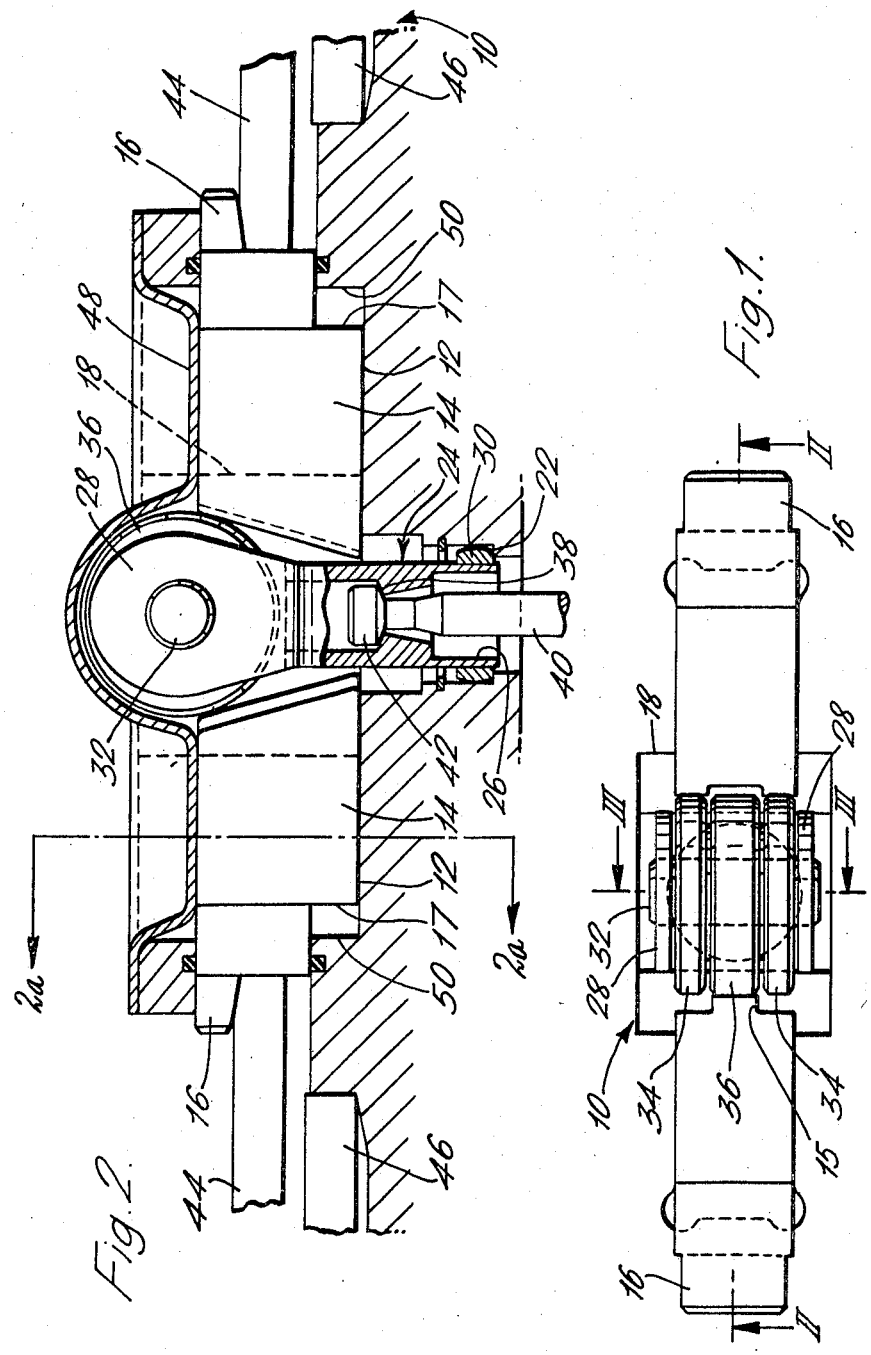

United States Patent Office 3,491,606
Patented Jan. 27, 1970

3,491,606
ROLLER EXPANDER ACTUATOR
FOR VEHICLE BRAKES
Charles Newstead, Walsall, England, assignor to
Girling Limited, Birmingham, England
Continuation-in-part of application Ser. No. 669,084,
Sept. 20, 1967. This application July 15, 1968, Ser.
No. 745,046
Int. Cl. F16h 21/44, 25/18
U.S. Cl. 74—110
3 Claims

ABSTRACT OF THE DISCLOSURE

This invention provides a mechanical coupling between the tappets and roller assembly of a so-called roller expander type of brake actuator to prevent relative movement between the tappets and rollers about the tappet axes to maintain line contact between the rollers and tappets at all times.

---

This application is a continuation-in-part of my pending application Ser. No. 669,084.

This invention concerns vehicle brake actuators of the so-called roller expander type. The invention is applicable although not exclusively to a roller expander brake actuator of the type disclosed in my above mentioned patent application.

Various proposals have already been made in relation to roller expander mechanisms for vehicle brake actuation but problems arise, for example, in keeping the rollers in their correct positions with respect to members such as wedges with which they are intended to co-operate in order to produce the expander action. In particular it is important that line contact is maintained between the roller and the wedge members.

According to the present invention in a brake actuator comprising tappets having opposed inclined ends each engaged by roller means rotatable on a common shaft between the arms of a bifurcated yoke and movable at least in line with the tappet axes, line contact is maintained between the roller means and the opposed inclined ends of the tappets by a mechanical coupling between the tappets and the yoke to restrain the tappets from rotation about their axes relative to the yoke and therefore the roller means carried thereon.

Where tappets of rectangular or square cross-section are employed, the mechanical coupling is provided by the actuator housing within which the yoke is slidably mounted.

Where tappets of circular cross-section are employed, rectangular bearing pads are fitted to the inclined ends of the tappets which are slidably received between internal parallel faces of the yoke to form the mechanical coupling.

It will be appreciated that the ability of the common shaft to move in line with the tappet axes provides accommodation for relative and asymmetrical movement of the rollers relative to the tappets resulting from uneven wears of the brake shoes in use.

The roller means preferably comprises a plurality of individual rollers each respectively co-operating with one of the tappets, the yoke itself being rockable to permit the movement of the pin in line with the tappet axes. For this purpose, the yoke may have a stem passing through an externally part-spherical collar engaged in a bore of a body member of the actuator.

The invention will be described further, by way of example, with reference to the accompanying drawings, in which:

FIG. 1 is a plan view, with a cover removed for clarity, of the essential parts of one actuator embodying the invention, FIG. 2 is an axial section taken on the line II—II of FIG. 1 and including parts additional thereto, FIG. 2a is a vertical cross sectional view taken substantially FIG. 3 is a sectional detail taken on the line III—III of FIG. 1, FIG. 4 is a plan view of another actuator embodying the invention, with a cover removed for clarity, FIG. 5 is an axial section taken on line A—A of FIG. 4.

Figure 3:
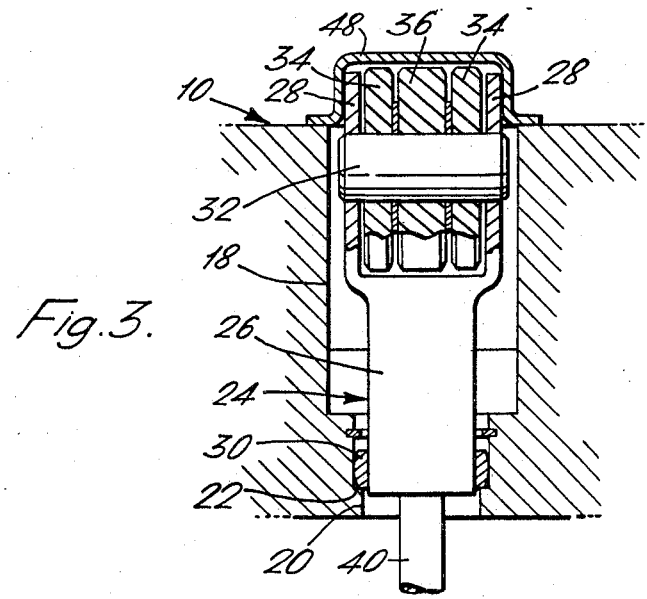

The invention as illustrated in the drawings is shown as being applied to a carrier-actuated drum brake arrangement in which mechanically displaced tappets operate against carriers which in turn apply the brake shoes to the drum. It will, however, be understood that the invention may equally well be used in a brake without carriers, in which case the tappets directly engage the shoe ends.

In the drawings, an actuator body member 10 is formed with aligned bores 12 in each of which is slidably received a tappet 14 of rectangular section. Each tappet 14 has an end 16 of circular section projecting slightly from the body member 10. Centrally between the bores 12, the body member 10 is formed with an intermediate chamber 18 and a stepped opening 20 directed perpendicularly to the axes of the bores 12 and having an internal shoulder 22, passes through a wall of the body member bounding one face of the chamber 18.

Figure 2A:
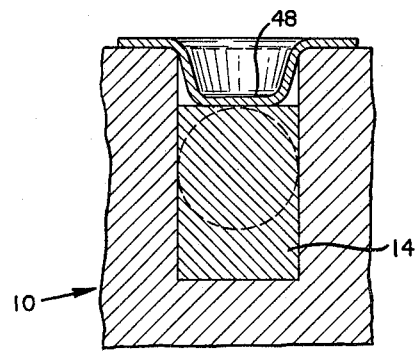
Figure 7:
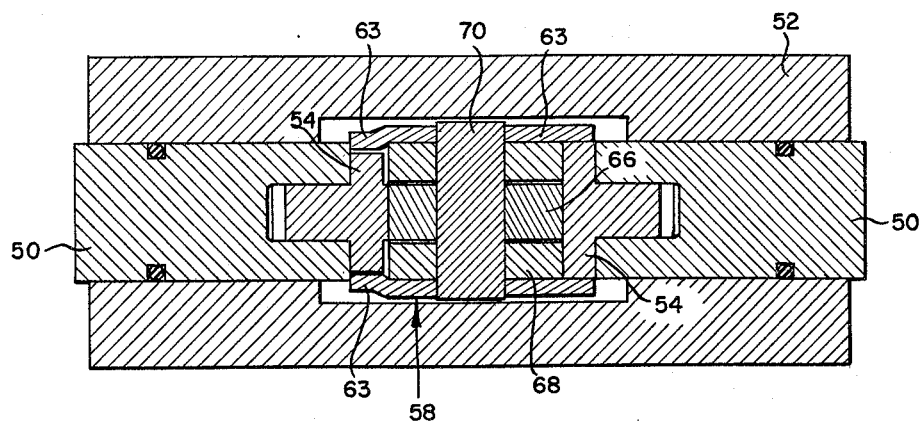
FIG. 7 is a horizontal cross sectional view taken substantially on the line 7—7 of FIG. 5.

The inner ends of the tappets extend into the chamber 18 and are equally and oppositely inclined relative to one another. A yoke 24 having a stem 26 terminating in bifurcated arms 28 passes through the opening 20, where the stem is received within an externally part-spherical collar 30 resting on the shoulder 22, the arms 28 of the stem being situated within and beyond the part of the chamber remote from the opening 20. Transversely between the arms 28 is mounted a pin 32 on which are carried two outer rollers 34 and a central, inner roller 36, the rollers 34 engaging the inclined inner end face of the right-hand tappet 14 as viewed in FIGS. 1 and 2 and the central roller 36 engaging the corresponding inner end face of the other tappet. The three rollers are all of the same diameter. As will be seen, the tappet engaged by the rollers 34 is centrally notched to clear the roller 36 while the other tappet is provided with a central land 15 to contact that roller and enable the remainder of the tappet to clear the rollers 34.

The yoke stem 26 is internally hollow and formed with an internal part-spherical seat 38 for a co-operating head 42 of a pull rod 40 introduced into the stem. The outer ends 16 of the tappets 14 engage carriers 44 which are arranged in turn to apply brake shoes 46 to the brake drum (not shown).

In use, the actuator body member 10 is secured to the usual brake back plate and mechanical operation of the brake is effected by exerting an outward pull on the pull rod 40. This moves the rollers 34 and 36 through the yoke 24 and pin 32 in a direction to cause separation of the tappets 14 which accordingly slide outwardly of their bores 12 to displace the carriers 44 and brake shoes 46. Since the yoke 24 is rockably mounted by virtue of the collar 30, it is able to move interalia along the line of the tappet axes if required, and in practice, uneven wear of the brake shoes will eventually result in relative and asymmetrical movement of the rollers 34 and 36 with respect to the tappets, this relative movement being accommodated by the ability of the yoke 24 to rock as described.

As will be noted, the actuator is provided with a cover 48 which also serves to stop the rollers in the brake release direction. In the brake applying direction, shoulders 17 defined on the tappets between their ends 16 and the adjoining portions are stopped against shoulders 50 formed in the body member 10. In the off position, the tappets engage the yoke stem 26. It will be noted that the pin 32 maintained in an endwise direction by the by the body member walls bounding the chamber 18.

Figure 4:
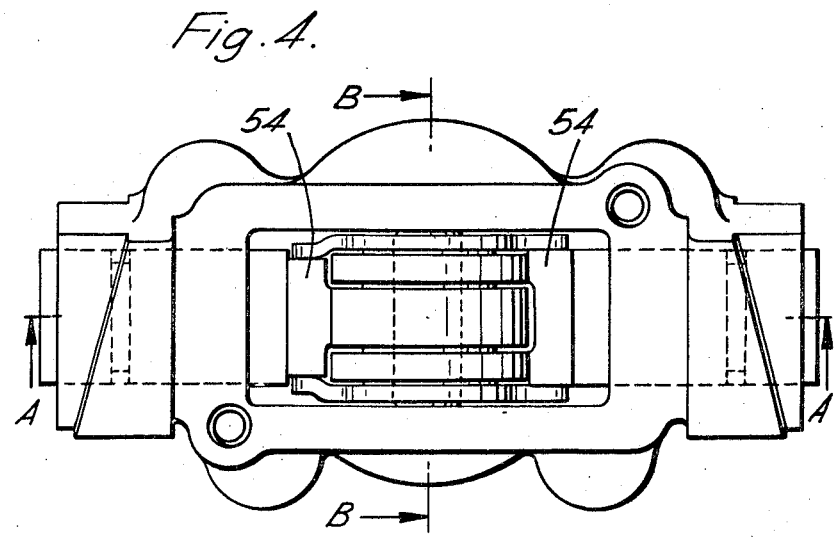
Figure 5:
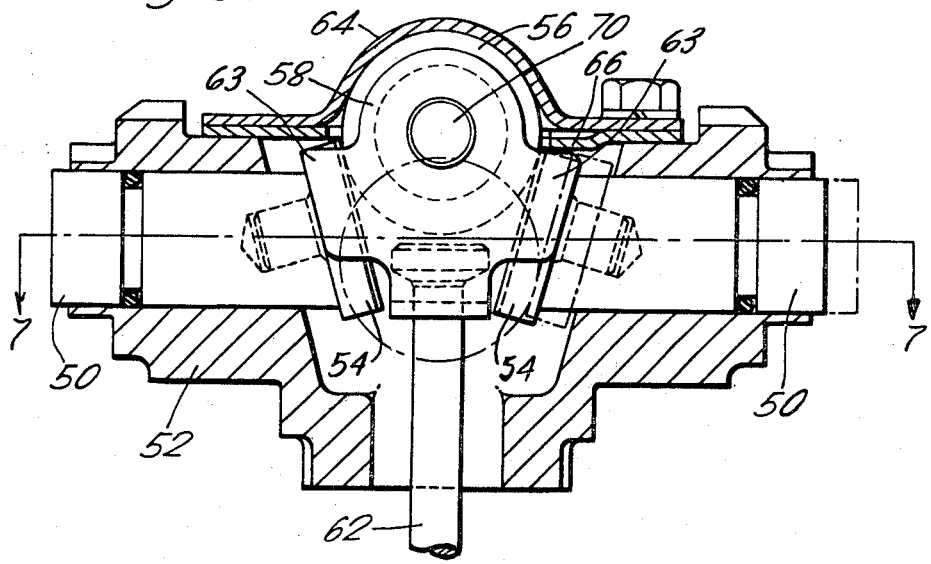
Figure 6:
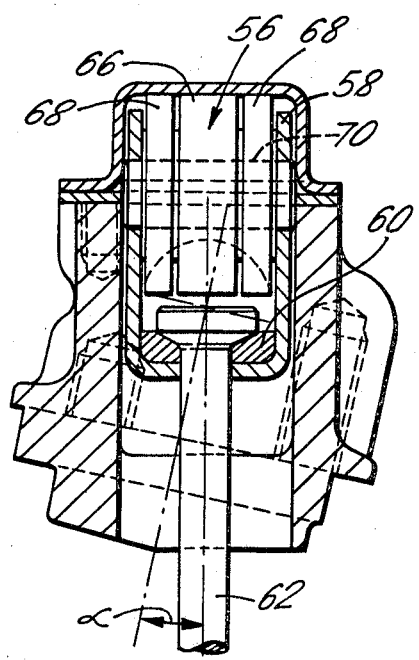
FIG. 6 is a sectional detail taken on the line B—B of FIG. 4.

FIGS. 4, 5 and 6 illustrate and alternative embodiment of the invention wherein two oppositely displaceable tappets 50 are guided in aligned bores in a housing 52. The two tappets are of circular cross-section and rectangular bearing pads 54 are spigotted into the inclined inner end faces of the two tappets. The bearing pads 54 are formed from hard wearing material and as best seen in FIG. 4, they are of differing width. The roller assembly generally designated 56 is carried by a yoke 58 which is generally U-shaped and includes a rectangular insert 60 (see FIG. 6) at its lower end having a frusto-spherical recess which constitutes a seating for the head of pull rod 62. Again referring particularly to FIG. 4, the two bearing pads 54 are a close slipping fit between parallel faces 63 on opposite sides of the U-shaped yoke 58 which serves to centralise the yoke within the housing 52 and prevents relative rotation of the yoke and tappets about the axes of the latter.

The housing is closed by a cover 64 the right hand end of which includes an internal abutment 66, formed by inward deformation of the cover. In order that the right hand tappet clears this abutment, the bearing pad 54 mounted thereon is shorter than the corresponding pad 54 on the left hand tappet. It will be appreciated that because of the abutment 66 the cover could not be fitted to the housing if the tappets were incorrectly assembled. Likewise the tappets cannot be incorrectly fitted in the yoke since they are of differing width and the yoke is dimensioned accordingly.

In order to facilitate mounting adjacent parts of the complete brake assembly the housing 52 is adapted for fitting to a brake backplate (not shown) so that the pull-rod 62 projects from the backplate at an angle $\alpha°$ (see FIG. 6). Preferably this angle $\alpha°$ equals 11°30′.

The roller assembly 56 comprises a central roller 66 and two outer rollers 68 mounted for independent rotation about a pin 70 the three rollers having the same diameter.

I claim:
1. In a brake actuator comprising a housing member, tappets slidable within said housing member and having opposed inclined ends each engaged by roller means rotatable on a common shaft between the arms of a bifurcated yoke member and movable at least in line with the tappet axes; a mechanical coupling between the tappets and one of the other of said members constructed and arranged to restrain the tappets from rotation about their axes.

2. In a brake actuator as set forth in claim 1 wherein the mechanical coupling is between said tappets and said housing member and comprises tappets of rectangular cross-section non-rotatably and slidably mounted in complementary bores in said housing member.

3. A brake actuator as set forth in claim 1 wherein at least the inclined ends of the tappets are of rectangular cross-section and wherein said mechanical coupling is between said tappets and said yoke member and comprises parallel faces on said yoke member slidably receiving therebetween the rectangular ends of said tappets.

No references cited.

FRED C. MATTERN, Jr., Primary Examiner

W. S. RATLIFF, Jr., Assistant Examiner

U.S. Cl. X.R.

188—78